United States Patent Office.

GEORGES FELIX HENRY, IVAR AXEL FERDINAND BANG, FRANÇOIS ROCH CHARLES MONESTIER, AND JEAN PIERRE ALBIN FIGUIER, OF PARIS, FRANCE.

Letters Patent No. 93,617, dated August 10, 1869.

IMPROVED MATERIAL FOR LUBRICATING WOOL AND OTHER ANIMAL FIBRES.

The Schedule referred to in these Letters Patent and making part of the same.

*To all whom it may concern:*

Be it known that we, GEORGES FELIX HENRY, IVAR AXEL FERDINAND BANG, FRANÇOIS ROCH CHARLES MONESTIER, and JEAN PIERRE ALBIN FIGUIER, of Paris, in the Empire of France, have invented an Improvement in Liquids for the Lubrication of Sheep's or other Wool, or other animal textile fibrous materials; and we do hereby declare that the following is a full and exact description thereof.

It has been the practice hitherto, in the manufacture of cloth, or other fabrics from sheep's or other wool, or other similar animal textile fibrous materials, of lubricating or intimately imbibing the said fibrous materials, after having deprived them of the yolk, or adhering natural grease, and previous to submitting them to combing, carding, spinning, or other similar operations, with oil or other unctuous fatty liquids, in order to increase the supple and smoothness of the fibres or filaments, and thus making them less liable to rupture.

Our invention consists in replacing the oil or fatty matters hitherto made use of for the above-said purpose, by a solution in water, or other suitable menstruum, of any suitable hygroscopic deliquescent salt or combinations of such salts, with which solution we imbibe or lubricate the sheep's or other wool, or other similar animal textile fibrous materials intended to be submitted to combing, carding, spinning, or other similar operations, and previously deprived of the yolk or adhering natural grease.

The salt we prefer making use of for this purpose is the chloride of calcium, dissolved in water, and reduced to such state of concentration as to allow of its suitably moistening the animal filaments.

Solutions of chloride of magnesium, chloride of zinc, or of other suitable hygroscopic deliquescent salts, or combinations of such salts, such, for instance, as the mother-liquids of the manufacture of sea-salt, might be resorted to, neutral salts being preferable, though, if required, any oxidizing-effects might be prevented by the addition of small quantities of ammonia, or other suitable alkaline bodies.

Our solutions are made use of in a similar manner as oil or other fatty liquids are employed for lubricating sheep's wool, viz, by sprinkling, rubbing, steeping, or other suitable means, and the wool or other animal textile fibrous materials require to have been deprived previously of the yolk, or adhering natural grease.

Having thus described the nature of our invention, and the manner of putting the same into effect, we declare that what we consider to be novel and original, and consequently claim as our invention, is—

Employing solutions of chloride of calcium, chloride of magnesium, chloride of zinc, or other suitable hygroscopic deliquescent salts, or combinations of them, with or without the addition of ammonia, or other suitable alkaline bodies, for the lubrication of sheep's or other wool, or other similar animal textile fibrous materials, when the said materials are to be submitted to combing, carding, spinning, or other similar operations.

G. F. HENRY.
I. A. F. BANG.
F. R. C. MONESTIER.
J. P. A. FIGUIER.

Witnesses:
A. G. BRADI,
F. OLCOTT.